| (12) | United States Patent | (10) Patent No.: | US 9,906,702 B2 |
|---|---|---|---|
| | Sakai | (45) Date of Patent: | Feb. 27, 2018 |

(54) NON-TRANSITORY COMPUTER-READABLE STORAGE MEDIUM, CONTROL METHOD, AND COMPUTER

(71) Applicant: FUJITSU LIMITED, Kawasaki-shi, Kanagawa (JP)

(72) Inventor: Takafumi Sakai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/420,607

(22) Filed: Jan. 31, 2017

(65) Prior Publication Data

US 2017/0237892 A1 Aug. 17, 2017

(30) Foreign Application Priority Data

Feb. 16, 2016 (JP) .................. 2016-027438

(51) Int. Cl.
```
H04N 5/232   (2006.01)
G06T 7/70    (2017.01)
G06F 3/14    (2006.01)
G06F 7/20    (2006.01)
G06T 11/60   (2006.01)
```
(Continued)

(52) U.S. Cl.
CPC ........... *H04N 5/23203* (2013.01); *G06F 3/14* (2013.01); *G06T 7/20* (2013.01); *G06T 7/70* (2017.01); *G06T 11/60* (2013.01); *H04N 7/185* (2013.01)

(58) Field of Classification Search
CPC ......... H04N 2201/3253; H04N 21/422; H04N 21/4104; H04N 5/23203; H04N 7/185; G06T 11/60; G06T 7/20; G06T 7/70; G06F 3/14; G06F 3/01; G06F 2221/2111; G06F 21/123

USPC ...................................................... 348/207.1
See application file for complete search history.

(56) References Cited

U.S. PATENT DOCUMENTS

| 7,710,654 B2 * | 5/2010 | Ashkenazi | G02B 27/0093 |
| | | | 345/7 |
| 8,138,991 B2 * | 3/2012 | Rorberg | G02B 27/017 |
| | | | 345/634 |

(Continued)

FOREIGN PATENT DOCUMENTS

| JP | 2003-132068 | 5/2003 |
| JP | 2011-257865 | 12/2011 |

(Continued)

*Primary Examiner* — Pritham Prabhakher
(74) *Attorney, Agent, or Firm* — Staas & Halsey LLP

(57) ABSTRACT

A control method executed by a computer including acquiring a first image, acquiring a first location of the target by using a wireless positioning system, displaying the first image and display information that is superimposed on the first image, the display information being displayed with associating with a first location coordinate determined based on the first location of the target, acquiring a second image, acquiring a second location of the target when a specified period of time elapses after the first location is acquired, acquiring a distance of movement of the target during the specified period of time by using an inertial sensor, making a determination of whether the display information is to be displayed with associating with the first location coordinate or a second location coordinate based on the distance of movement, the second location coordinate being determined based on the second location.

13 Claims, 13 Drawing Sheets

(51) Int. Cl.
*H04N 7/18* (2006.01)
*G06T 7/20* (2017.01)

(56) References Cited

U.S. PATENT DOCUMENTS

| | | | | |
|---|---|---|---|---|
| 8,585,476 | B2 * | 11/2013 | Mullen | A63F 13/211 463/1 |
| 8,698,902 | B2 * | 4/2014 | Kawamoto | G06T 19/006 348/207.1 |
| 8,970,690 | B2 * | 3/2015 | Meier | G06T 19/006 345/158 |
| 9,261,954 | B2 * | 2/2016 | Tsurumi | G06F 3/011 |
| 9,619,940 | B1 * | 4/2017 | Lotto | G06T 19/006 |
| 9,646,418 | B1 * | 5/2017 | Lotto | G06T 19/006 |
| 2010/0208057 | A1 * | 8/2010 | Meier | G06T 19/006 348/135 |
| 2014/0028718 | A1 * | 1/2014 | Lindner | H04M 1/72522 345/633 |
| 2014/0240552 | A1 | 8/2014 | Kasahara | |
| 2015/0170367 | A1 * | 6/2015 | Nachman | G06T 7/0042 382/106 |
| 2016/0109940 | A1 * | 4/2016 | Lyren | H04W 4/023 463/2 |

FOREIGN PATENT DOCUMENTS

| | | |
|---|---|---|
| JP | 2013-105285 | 5/2013 |
| WO | WO 2015/071940 A1 | 5/2015 |

* cited by examiner

FIG. 4

| | LATITUDE | LONGITUDE | ALTITUDE [m] | ACQUISITION TIME | |
|---|---|---|---|---|---|
| APPLIED LOCATION INFORMATION | 35.002XXX | 132.00XXX | 10.0 | 2015/12/XX, XX:XX:XX | ~311 |
| LAST LOCATION INFORMATION | 35.002XXX | 132.00XXX | 10.0 | 2015/12/XX, XX:XX:XX | ~312 |
| NEW LOCATION INFORMATION | 35.002XXX | 132.00XXX | 10.1 | 2015/12/XX, XX:XX:XX | ~313 |

FIG. 5

| AZIMUTH [deg] | 40.0 | ~321 |
|---|---|---|
| ROLL ANGLE [deg] | 5.0 | ~322 |
| PITCH ANGLE [deg] | 1.5 | ~323 |

FIG. 7

| EXECUTION CYCLE [sec] | 1 | ~331 |
|---|---|---|
| UPPER LIMIT VALUE [m] | 7 | ~332 |
| LOWER LIMIT VALUE [m] | 2 | ~333 |

FIG. 8

| CONTENT ID | DISPLAY INFORMATION (BEFORE TAP) | DISPLAY INFORMATION (AFTER TAP) | LATITUDE | LONGITUDE |
|---|---|---|---|---|
| | | 341 | 342 | 343, 344 |
| 0001 | ○○ SHOP XX STORE DURING PROMOTION | PROMOTION INFORMATION 1.LIMITED COUPON ... | 35.002XXX | 132.00XXX |
| 0002 | XXX CORPORATION | contents2.jpg | 35.005XXX | 132.020XXX |
| 0003 | YYY CORPORATION Http://YYY... | ※MOVE TO WEBSITE | 35.005XXX | 132.020XXX |
| 0004 | ITEMS ON SALE ANNOUNCED IN STORE (30 M OR GREATER) | — | 35.005XXX | 132.020XXX |
| | TAP TO SEE IMAGE (LESS THAN 30 M) | contens4.jpg (LESS THAN 30 M) | 35.005XXX | 132.020XXX |
| ... | ... | ... | ... | ... |

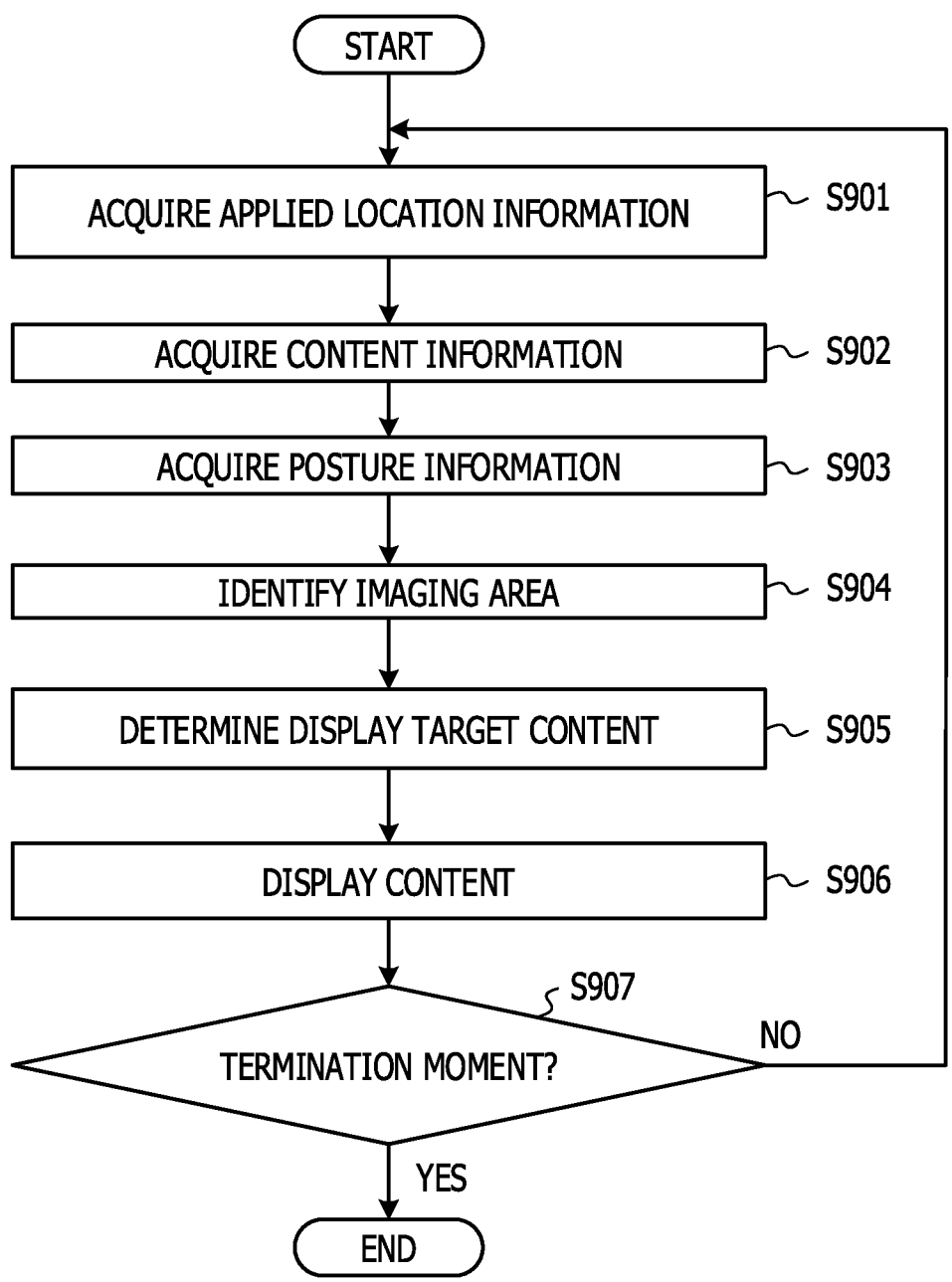

NON-TRANSITORY COMPUTER-READABLE STORAGE MEDIUM, CONTROL METHOD, AND COMPUTER

CROSS-REFERENCE TO RELATED APPLICATION

This application is based upon and claims the benefit of priority of the prior Japanese Patent Application No. 2016-027438, filed on Feb. 16, 2016, the entire contents of which are incorporated herein by reference.

FIELD

The embodiment discussed herein is related to a control program, a control method, and a computer.

BACKGROUND

There are applications and services that utilize an information terminal and location information. For example, applications and services utilizing augmented reality (AR) techniques have been provided, owing to the development of the AR techniques and the spread of mobile information terminals such as smartphones. When a mobile information terminal displays a motion image captured by a camera included in the mobile information terminal on a display screen included in the mobile information terminal, the mobile information terminal uses its location information to superimpose and display additional display information (content) such as a description of a subject present in the motion image.

More specifically, the mobile information terminal, for example, acquires its location information and the direction of imaging of the camera, and identifies the imaging area imaged by the camera from the location information and the imaging direction information. Further, from a server apparatus, the imaging apparatus acquires information on a content associated with a geographical position present in the identified imaging area, and superimposes and displays the content at the corresponding position in the motion image displayed on the display screen.

When the location of the mobile information terminal changes with movement of its user, the imaging area imaged by the camera changes as well. In this case, the mobile information terminal continuously acquires its location and updates the display position of the content on the display screen in accordance with the change in the acquired location. The content may thus be displayed while following the change in the location of the mobile information terminal. In this way, a service such for example as providing a description of a building imaged by the camera included in the mobile information terminal or navigating is provided utilizing an AR technique.

Related techniques are disclosed in, for example, Japanese Laid-open Patent Publication No. 2011-257865.

SUMMARY

According to an aspect of the invention, a non-transitory computer-readable storage medium storing a control program that causes a computer to execute a process, the process including acquiring a first image, acquiring a first location of the target by using a wireless positioning system, the first location corresponding to the first image, displaying the first image and display information that is superimposed on the first image, the display information being displayed with associating with a first location coordinate on the first image, the first location coordinate being determined based on the first location of the target, acquiring a second image after the first image is acquired, acquiring a second location of the target by using the wireless positioning system when a specified period of time elapses after the first location is acquired, the second location corresponding to the second image, acquiring a distance of movement of the target during the specified period of time by using an inertial sensor included in the target, making a determination of whether the display information is to be displayed with associating with the first location coordinate or a second location coordinate on the second image data based on the distance of movement, the second location coordinate being determined based on the second location of the target, and displaying the second image and the display information that is superimposed on the second image based on the determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of information stored in a location-information storage part;

FIG. 5 illustrates an example of information stored in a posture-information storage part;

FIG. 7 illustrates an example of information stored in a setting-information storage part;

FIG. 8 illustrates an example of information stored in a content-information storage part;

FIG. 9 illustrates a flowchart describing a content display process;

DESCRIPTION OF EMBODIMENT

In a case of utilizing the Global Positioning System (GPS) or the like to acquire location information, the acquired location information sometimes shifts even if the location of the mobile information terminal has not actually changed, due to the accuracy of acquisition of the location information and the like. Then, for example, when the user of the mobile information terminal is looking at the display screen of the mobile information terminal, the display position of a content in a display region on the display screen sometimes shifts even if the user and the terminal are remaining still. If the display position of the content on the display screen shifts frequently while the user and the terminal are remaining still, the visibility for viewing the content on the display screen is decreased, which in turn decreases the usability of the service.

Among mobile information terminals, there are apparatuses including a touchscreen. A mobile information terminal including a touchscreen may possibly perform control such that, for example, in response to detection of an operation such as tapping on the display screen at the position of a content displayed on the display screen, information on a more detailed content is displayed. However, if the display position of the content shifts frequently as mentioned above, its position in a display region to be tapped shifts frequently as well. Accordingly, the operability for using the application is decreased, which in turn decreases the usability of the service.

Note that besides the above cases, the above-mentioned decrease in visibility and operability might possibly occur also in a case where, for example, a terminal apparatus is used to check location information on a remote robot or a drone, and in other similar cases.

According to one aspect, it is an object to suppress excessive shift in the position of a display object displayed in a display region.

An embodiment will be described with reference to the drawings. Note that this embodiment merely represents one mode, and the details of processes in the embodiment, their order of execution, and so on may be changed as appropriate within such a scope that the disclosure is realized.

First, a specific example of a problem to be solved in this embodiment will be described.

Figure 1:
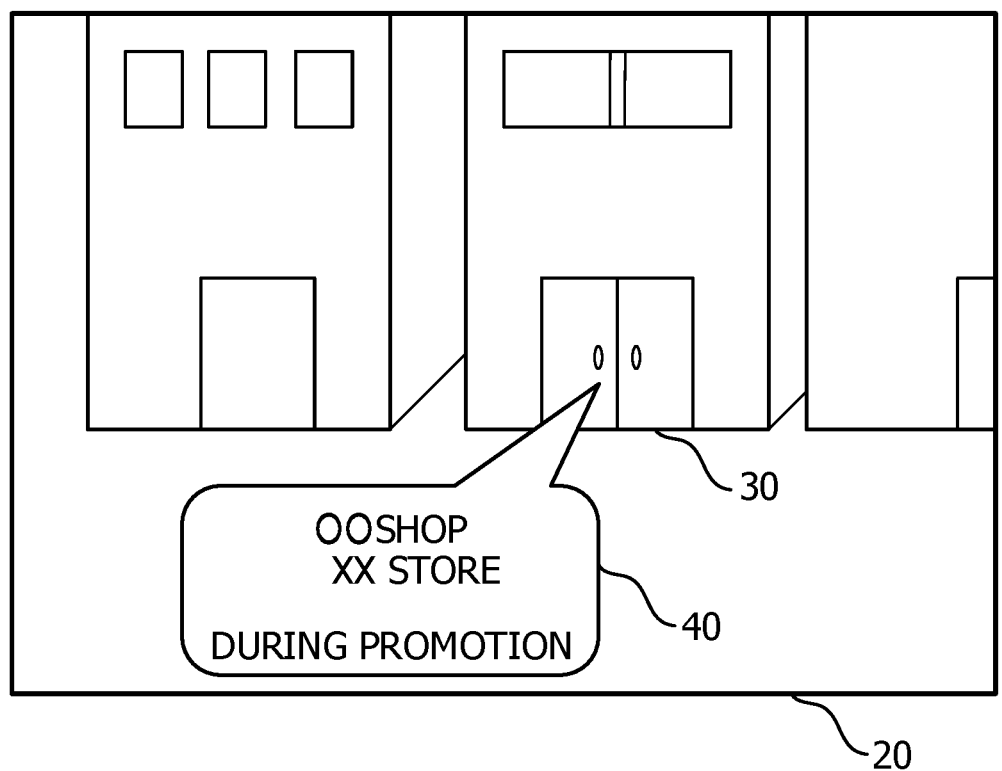
FIG. 1 illustrates an example of an application using an AR technique.

FIG. 1 is a diagram illustrating an example of an application using an AR technique. In FIG. 1, for example, additional display information (hereinafter referred to as "content") is superimposed and displayed on a motion image captured by a camera or the like incorporated in a mobile information terminal and displayed on a display screen 20 of the mobile information terminal. In FIG. 1, for example, a content 40 is superimposed and displayed on the motion image displayed on the display screen 20. Here, the content 40 is information on a building 30, and the content 40 is displayed in the form of a word balloon with its start point set at the position of the building 30 in the motion image displayed on the display screen 20. By viewing a display screen as illustrated in FIG. 1, the user of the application may find out what kind of building the building 30 is. Also, in a case where the building 30 is, for example, a shop, information such as "●● shop XX store" and "during promotion" may be displayed as a content, as illustrated in FIG. 1. In this way, the user of the application may also obtain information about sale or promotion the shop is having. The display position of the content 40 on the display screen 20 is determined based on location information set for the content 40, the location information on the mobile information terminal, the direction of the camera, and so on. In a case where the location information set for the content 40, the location information on the mobile information terminal, or the direction of the camera is changed, the display position of the content 40 on the display screen 20 is changed as well. That is, changes in positions of the targets such as the mobile information terminal lead to a change in display position of the content 40 on the display screen 20.

Figure 2:
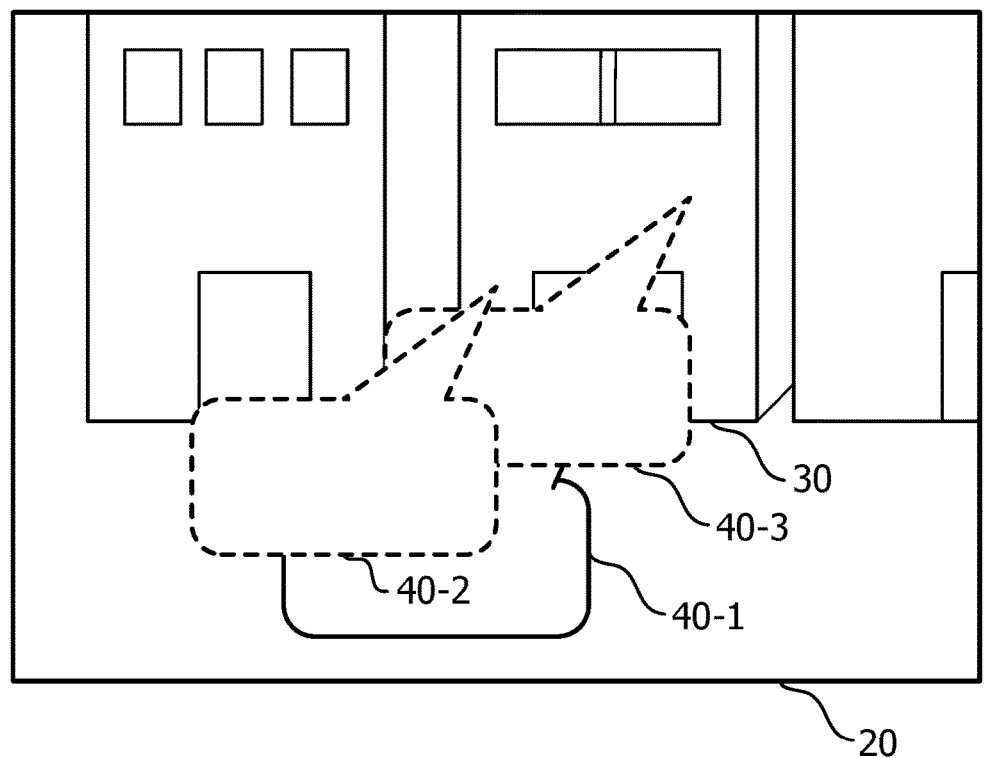
FIG. 2 illustrates an example of a situation to be solved in an embodiment.

FIG. 2 is a diagram illustrating an example of a situation to be solved in this embodiment. As mentioned earlier, even if the location of the mobile information terminal has not actually changed, the acquired location information sometimes shifts due to the accuracy of acquisition of the location information and the like.

Thus, even if, for example, the user of the mobile information terminal stops moving to check information, continuing imaging the same imaging area, the display position of the content on the display screen 20, based on the acquired location information, might frequently change. This then results in a situation where the display position of the content illustrated in FIG. 2 as a content 40-1 shifts instantly to a position illustrated as a content 40-2 or a position illustrated as a content 40-3. Note that contents 40-1 to 40-3 are all illustrated in FIG. 2 but one content is actually displayed at one of the positions. Also, various pieces of information are supposed to be displayed inside the word balloon regions of the contents 40-1 to 40-3, but are omitted in FIG. 2.

As described above, if the display position of a content changes frequently, the visibility of the information displayed as the content is impaired, and the usability of the application is decreased. Also, in the case of performing, for example, an operation involving tapping a displayed content on a touchscreen or the like, frequent changes in the position to be tapped, that is, the display position of the content impair the operability. It is one object in this embodiment to solve the above-described matter.

[Functional Block]

Figure 3:
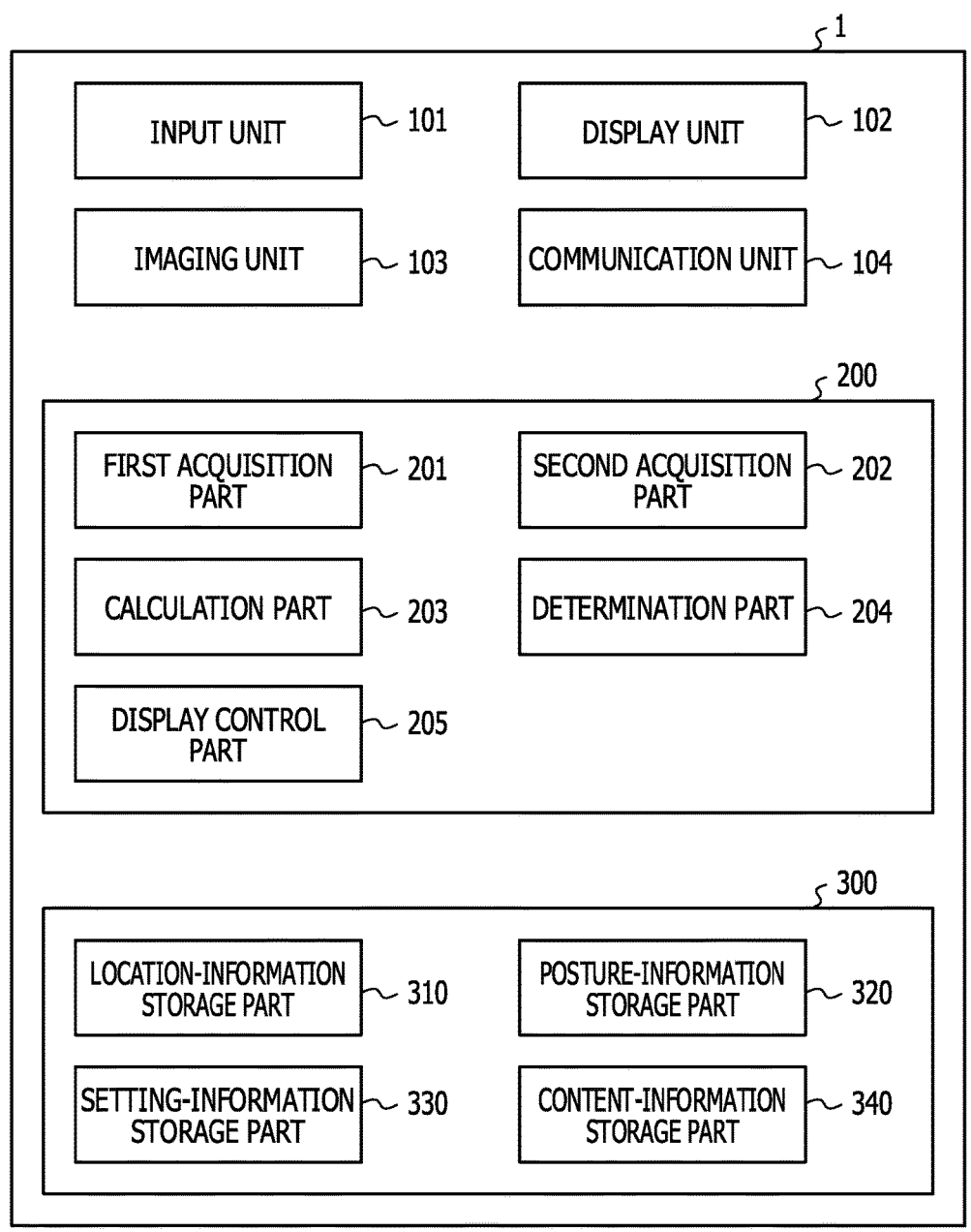
FIG. 3 illustrates a functional block diagram of a terminal apparatus.

FIG. 3 is a functional block diagram of a terminal apparatus 1. Note that the terminal apparatus 1 is, for instance, an information processing apparatus such as a smartphone, a tablet personal computer (PC), a laptop PC, and a personal digital assistant (PDA), and is an example of the mobile information terminal mentioned above.

An input unit 101 receives operational inputs from the user. A display unit 102 displays (outputs) various pieces of information in accordance with control executed by a later-described control unit 200. The input unit 101 and the display unit 102 are a touchscreen, for example.

An imaging unit 103 is a component that captures motion images, and is, for example, a camera incorporated in the terminal apparatus 1.

A communication unit 104 performs wired or wireless communication with other information processing apparatuses. The communication unit 104 is, for example, a communication device such as a network adaptor or a network interface controller (NIC) included in the terminal apparatus 1.

The control unit 200 includes a first acquisition part 201, a second acquisition part 202, a calculation part 203, a determination part 204, and a display control part 205. The control unit 200 is implemented when, for example, a processor included in the terminal apparatus 1 executes a program. Here, the processor is a collective term for hardware circuits such as central processing unit (CPU), micro processing unit (MPU), and application specific integrated circuit (ASIC).

The first acquisition part 201 acquires the location information on the terminal apparatus 1, which is calculated based on information acquired by a GPS receiver and an inertial sensor included in the terminal apparatus 1 or the like. Here, the inertial sensor refers to a sensor device having the function of at least one of an acceleration sensor and a gyro sensor or the functions of both.

The second acquisition part 202 acquires a content to be superimposed and displayed on a motion image by using the AR technique, the motion image being captured by the imaging unit 103 and displayed on the display unit 102.

Based on pieces of location information on the terminal apparatus 1 acquired by the GPS receiver included in the terminal apparatus 1, the calculation part 203 calculates the difference between the locations indicated by the pieces of location information on the terminal apparatus 1 over a predetermined period of time, for example. Alternatively, the calculation part 203 may calculate the location information on the terminal apparatus 1 and the distance of movement of the terminal apparatus 1 in a predetermined period of time based on measurement values acquired by the acceleration sensor and the gyro sensor included in the terminal apparatus 1.

The determination part 204 executes a process of determining whether or not to change the display position of the content displayed on the display unit 102, based on the location information on the terminal apparatus 1 or the difference between the locations indicated by pieces of location information, calculated by the calculation part 203. Details of the determination process will be described later.

The display control part 205 controls the output of various pieces of information to be displayed to the display unit 102. For example, the display control part 205 controls the output of information to the display unit 102 in accordance with the result of the determination process executed by the determination part 204. Besides the above, the display control part 205 controls the overall display of information on the display unit 102.

A storage unit 300 stores various pieces of information that are, for example, acquired and referred to in this embodiment. The storage unit 300 includes, for example, a location-information storage part 310, a posture-information storage part 320, a setting-information storage part 330, and a content-information storage part 340, as illustrated in FIG. 3.

The storage unit 300 is implemented by using, for example, a storage medium included in the terminal apparatus 1, such as a memory, a hard disk drive (HDD), or a solid state drive (SSD). Also, some or all of the location-information storage part 310, the posture-information storage part 320, the setting-information storage part 330, and the content-information storage part 340, included in the storage unit 300, may be provided in a different information processing apparatus (server apparatus) or storage apparatus with which the terminal apparatus 1 may communicate using the communication unit 104. Alternatively, some or all of the location-information storage part 310, the posture-information storage part 320, the setting-information storage part 330, and the content-information storage part 340, included in the storage unit 300, may use a record medium which the terminal apparatus 1 may read. The record medium which the terminal apparatus 1 may read is, for example, a compact disc read only memory (CD-ROM), a digital versatile disc read only memory (DVD-ROM), a Universal Serial Bus (USB) memory, a Secure Digital (SD) memory card, or the like.

The location-information storage part 310 stores, for example, location information on the terminal apparatus 1 acquired by the GPS receiver included in the terminal apparatus 1. Also, the location-information storage part 310 may store, for example, pieces of location information on the terminal apparatus 1 calculated by the calculation part 204 based on measurement values acquired by the acceleration sensor and the gyro sensor included in the terminal apparatus 1.

The posture-information storage part 320 stores information indicating a state concerning the posture of the terminal apparatus 1 calculated by the calculation part 204 based on measurement values acquired by the acceleration sensor and the gyro sensor included in the terminal apparatus 1. The information indicating the state concerning the posture of the terminal apparatus 1 is, for example, the tilt of the terminal apparatus 1 relative to a datum such as a horizontal plane, the azimuth of the imaging direction of the imaging unit 103, the angle of elevation or depression of the imaging direction, and the like.

The setting-information storage part 330 stores setting information on processes to be executed by the terminal apparatus. Details of the setting information will be described later.

The content-information storage part 340 stores information on contents to be superimposed and displayed on motion images captured by the imaging unit 103 and displayed on the display unit 102. Details of the information stored in the content-information storage part 340 will be described later as well.

[Details of Information Stored in Storage Unit 300]

Details of the various pieces of information stored in the storage unit 300 will be described.

[Location Information]

FIG. 4 is an example of the information stored in the location-information storage part 310. The location-information storage part 310 stores, for example, applied location information 311, last location information 312, and new location information 313, as illustrated in FIG. 4. Each of the applied location information 311, the last location information 312, and the new location information 313 is, for example, information indicating the location of the terminal apparatus 1 acquired by the GPS receiver included in the terminal apparatus. Each of the applied location information 311, the last location information 312, and the new location information 313 contains, for example, information on the latitude, the longitude, the altitude, and the acquisition time.

The applied location information 311 is location information previously acquired by the GPS receiver or the like included in the terminal apparatus 1 and to be applied to a later-described content display process of displaying a content on the display unit 102. That is, in superimposing and displaying a content on the display unit 102, the terminal apparatus 1 is assumed to be present at the location indicated by the applied location information 311.

The last location information 312 is location information previously acquired by the GPS receiver or the like included in the terminal apparatus 1, and is used in a later-described calculation process executed by the determination part 204. In one mode, the last location information 312 may be, for example, location information acquired at a moment immediately preceding the later-described new location information 313, among pieces of location information previously acquired by the GPS receiver or the like included in the terminal apparatus 1. In another mode, the last location information 312 may be, for example, location information selected based on the later-described process executed by the determination part 204, among pieces of location information previously acquired by the GPS receiver or the like included in the terminal apparatus 1.

The new location information 313 is the location information with the latest acquisition time (acquisition timing) among the pieces of location information acquired by the GPS receiver or the like included in the terminal apparatus 1 at predetermined acquisition moments. The new location information 313 is used in the later-described calculation process executed by the determination part 204.

[Posture Information]

FIG. 5 is an example of the information stored in the posture-information storage part 320. The posture-information storage part 320 stores, for example, information on azimuth 321, roll angle 322, and pitch angle 323.

The azimuth 321 is information indicating the azimuth at which the imaging unit 103 of the terminal apparatus 1 is oriented. In a case where, for example, the terminal apparatus 1 includes a geomagnetic sensor, the first acquisition part 201 may acquire the azimuth identified by the geomagnetic sensor as the azimuth 321. It is however possible to utilize a sensor other than a geomagnetic sensor or a different type of hardware if it is capable of identifying the azimuth at which the imaging unit 103 of the terminal apparatus 1 is oriented.

Note that the value of the azimuth 321 described in FIG. 5 is an azimuthal angle in a north-based left-handed system in which north is at 0 degree. However, the format of specific data on the azimuth 321 is not limited to the north-based left-handed system; the azimuth 321 may be expressed as a different azimuthal angle such as an azimuthal angle in a south-based left-handed system or an east-based right-handed system, or in a data format other than these azimuthal angle formats.

The roll angle 322 is, for example, the tilt of the imaging unit 103 relative to a horizontal plane, and the pitch angle 323 is the vertical angle (angle of elevation or depression) of the imaging unit 103 relative to the horizontal plane. In the case where, for example, where the terminal apparatus 1 includes a gyro sensor, the first acquisition part 201 may acquire a roll angle and a pitch angle identified by the gyro sensor as the roll angle 322 and the pitch angle 323. It is however possible to utilize a sensor other than a gyro sensor or a different type of hardware if it is capable of identifying the tilt and the angle of elevation or depression of the imaging unit 103 of the terminal apparatus 1.

Note that the roll angle 322 described in FIG. 5 is in a format in which the roll angle 322 is 0 degree in a state where the imaging unit 103 is horizontal, and the angular value increases clockwise. Moreover, the pitch angle 323 described in FIG. 5 is such that the pitch angle 323 is 0 degree in the state where the imaging unit 103 is oriented horizontally (for example, a state where the optical axis of a camera lens is horizontal in the case where the imaging unit 103 is a camera), and the angle of elevation ranges from 1 to 90 degrees and the angle of depression ranges from −1 to −90 degrees. However, representation of specific data on the roll angle 322 is not limited to the format in FIG. 5 but may be a different data format from FIG. 5.

Figure 6:
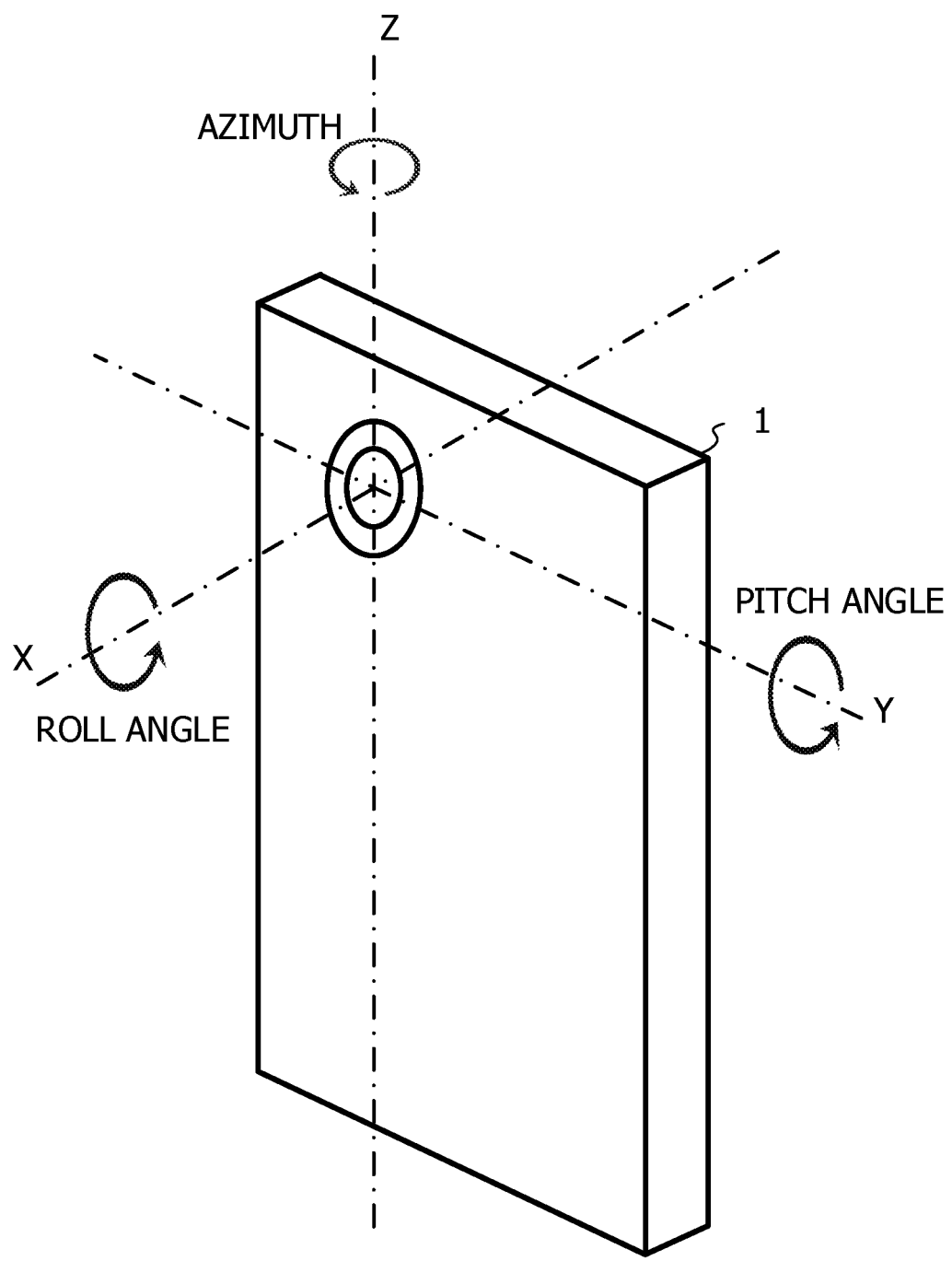
FIG. 6 is an illustration of azimuth, roll angle, and pitch angle.

FIG. 6 is an illustration of the above-described azimuth, roll angle, and pitch angle as a reference. Note that FIG. 6 is an illustration assuming that a Y axis and an X axis are each parallel to a horizontal plane and that a Z axis is perpendicular to the horizontal plane (parallel to the direction of gravity). The roll angle 322 and the pitch angle 323 are both 0 degree when the orientation of the imaging unit 103 is parallel to the X axis and perpendicular to the Z axis.

[Setting Information]

FIG. 7 illustrates an example of the information stored in the setting-information storage part 330. The setting-information storage part 330 stores, for example, an execution cycle 331, an upper limit value 332, and a lower limit value 333.

The execution cycle 331 is information indicating the cycle of execution of a later-described location-information update process by the terminal apparatus 1. The execution cycle 331 may, for example, be identical to the cycle of acquisition of the location information by the GPS receiver or the like included in the terminal apparatus 1, or a different cycle. Although FIG. 7 exemplarily illustrates an example where the execution cycle 331 is 1 second, the specific set value of the execution cycle 331 is not limited to only one value but may be changed as appropriate.

The upper limit value 332 and the lower limit value 333 are used in the later-described determination process executed by the determination part 204.

The upper limit value 332 may be determined taking into consideration, for example, allowable accuracy of acquisition of the location information to be acquired by the GPS receiver of the like included in the terminal apparatus 1 and the distance that the user of the terminal apparatus 1 may possibly move in the period from one acquisition moment to the next acquisition moment. The period from one acquisition moment to the next acquisition moment is the period indicated by the execution cycle 331.

For example, the upper limit value 332 may be 7 meters, as described in FIG. 7, assuming that the allowable accuracy of acquisition of the location information is a 5-meter error at most and the distance that the user of the terminal apparatus 1 may move by walking in 1 second, which is the execution cycle, is 2 meters. However, the numerical value of the upper limit value described in FIG. 7 and the method of determining the numerical value are exemplarily, and not limited to the above-mentioned numerical value. For example, assuming that the user of the terminal apparatus 1 moves by running, the distance that the user may move may be assumed to be a longer distance than 2 meters. Also, the allowable acquisition accuracy for the location information is not limited to the above-mentioned value, but may be changed as appropriate.

The lower limit value 333 may be determined taking into consideration, for example, the distance that the user of the terminal apparatus 1 may possibly move in the period from one acquisition moment to the next acquisition moment.

For example, the lower limit value 333 may be 2 meters, as described in FIG. 7, assuming that the distance that the user of the terminal apparatus 1 may move in 1 second, which is the execution cycle, is 2 meters. However, the above-mentioned numerical value of the lower limit value 333 and the above-mentioned method of determining the numerical value are exemplary, and not limited to the above-mentioned numerical value and method. For example, as in the upper limit value 332, assuming that the user of the terminal apparatus 1 moves by running, the distance that the user may move may be assumed to be a longer distance than 2 meters. Meanwhile, the distance that the user may move which is assumed in determining the upper limit value 332, and the distance that the user may move which is assumed in determining the lower limit value 333 may be identical or different numerical values.

[Content Information]

FIG. 8 is an example of the information stored in the content-information storage part 340. The content-information storage part 340 stores, for example, content information 341 to content information 344 illustrated in FIG. 8. Each of the content information 341 to the content information 344 contains, for example, information on content ID, display information (before tap input), display information (after tap input), latitude, and longitude.

How content information is utilized in this embodiment will be briefly described. For example, the content information 341, with a content ID of 0001, is a content associated with a location at a latitude of 35.002XXX and a longitude of 132.00XXX. Note that the content ID is identification information for uniquely identifying the registered content. Here, assume that a region corresponding to the latitude of 35.002XXX and the longitude of 132.00XXX is determined to be present in the imaging area of a motion image captured by the imaging unit 103 of the terminal apparatus 1. Then, character strings "●● shop XX store, during promotion", which are the display information (before tap input) of the content information 341, are superimposed and displayed on the motion image displayed on the display unit 102.

Assume further that the touchscreen or the like receives a tap input (designation) on the display information "●● shop XX store, during promotion", displayed on the display unit 102. As a result, character strings "Promotion information: 1. Limited coupon . . . ", which are the display information (after tap input) of the content information 341, are superimposed and displayed on the motion image displayed on the display unit 102. As described above, the terminal apparatus 1 provides the user with, for example, a description of geographical information utilizing an AR technique and content information.

The display information of the above-described content information 341 before tap input and that after tap input are text information. In another mode, the display information may be, for example, image data or video data, as in content information 342. For example, for the content information 342, image data "contents2.jpg" is set as the display information (before tap input).

Also, in response to a tap on a content, the terminal apparatus 1 may, for example, start another application and display information such that the website of a set uniform resource locator (URL) is displayed on a browser. For example, for the content information 343, a hyperlink to YYY Corporation's website is set as the display information (before tap input) and, in response to a tap on the hyperlink, the linked website may be browsed on a browser or the like installed in the terminal apparatus 1.

Also, the display information may be, for example, changed in accordance with the difference between the location of the terminal apparatus 1 and the location set for the content information. For example, for content information 344, text information "Items on sale, announced in store" is superimposed and displayed on the motion image displayed on the display unit 102 when the difference between the location of the terminal apparatus 1 and the location set for the content information 344 is 30 meters or greater. On the other hand, text information "Tap to see image" is superimposed and displayed on the motion image displayed on the display unit 102 when the difference between the location of the terminal apparatus 1 and the location set for the content information 344 is less than 30 meters. Further, image data "Contents4.jpg" is displayed on the display unit 102 upon receipt of a tap input on "Tap to see image" displayed on the display unit 102 when the difference between the location of the terminal apparatus 1 and the location set for the content information 344 is less than 30 meters.

[Content Display Process]

Next, the content display process in this embodiment will be described in detail.

FIG. 9 is a flowchart describing the content display process. With, for example, the start of the AR application in the terminal apparatus 1 or the like as a trigger, the content display process may be started. Also, with the start of the AR application in the terminal apparatus 1 or the like as a trigger, a motion image on which to superimpose and display a content may be continuously captured by the imaging unit 103 and displayed on the display unit 102.

First, in step S901, the display control part 205 reads out the applied location information 311, stored in the location-information storage part 310.

Then, in step S902, the second acquisition part 202 acquires content information corresponding to the applied location information 311, read out in step S901, from the content-information storage part 340. For example, from among the pieces of content information stored in the content-information storage part 340, the second acquisition part 202 identifies pieces of content information whose set location information differs by 100 meters at most from the location information indicated by the applied location information 311, and acquires the identified pieces of content information. Note that the above-mentioned reference value of 100 meters is an example and may be a different value. Moreover, the display control process may also be implemented even in a case where the second acquisition part 202 acquires all the pieces of content information stored in the content-information storage part 340 in step S902.

In step S903, the first acquisition part 201 acquires posture information. The posture information is, for example, information on the azimuth, the roll angle, and the pitch angle as illustrated in FIG. 5, and is acquired utilizing the geomagnetic sensor, the acceleration sensor, and the gyro sensor included in the terminal apparatus 1 or the like.

Then, in step S904, the display control part 205 identifies the imaging area of the imaging unit 103 based on the posture information acquired in step S903 and the applied location information 311 read out in step S901. In other words, the display control part 205 identifies the geographical region that may be imaged by the imaging unit 103. For the imaging area, the display control part 205, for example, identifies the location of the terminal apparatus 1 and the orientation of the image unit 103 from the information on the latitude, the longitude, and the altitude of the terminal apparatus 1 contained in the location information and the information on the azimuth, the roll angle, and the pitch angle contained in the posture information. The display control part 205 may then acquire the angle of view with which the imaging unit 103 captures a motion image, and identify the geographical region that may be included in the imaging area obtained by capturing an image in the identified orientation of the imaging unit 103 with the acquired angle of view.

Then, in step S905, the display control part 205 determines which contents to display on the display unit 102 among the contents whose content information has been acquired. For example, the display control part 205 determines for each piece of content information acquired in step S902 whether or not the location indicated by the latitude and the longitude contained in that content information is present in the geographical region identified in step S904. The display control part 205 then sets, as a target to be displayed on the display unit 102, each content corresponding to content information containing a latitude and a longitude that indicate a location determined to be present in the geographical area identified in step S904.

Then, in step S906, the content determined as a display target in step S905 is displayed at the position in the display region on the display unit 102 corresponding to the latitude and the longitude of the content information. In doing so, the motion image captured by the imaging unit 103 is being displayed on the display unit 102, and the content is superimposed and displayed on the motion image.

For example, if the geographical region that may be imaged by the imaging unit 103 is identified in step S904, the display control part 205 may identify a geographical coordinate, which is a two-dimensional coordinate, in the display region on the display unit 102. The display control part 205 may then display the display target content in association with the coordinate in the display region on the display unit 102 corresponding to the location information (geographical coordinate) set for the content information.

A specific mode of display may be employed as appropriate from various modes. For example, as illustrated in FIG. 1, a content may be displayed in the form of a word balloon starting from the coordinate in the display region on the display unit 102 corresponding to the location information (geographical coordinate) set for the content information. Alternatively, a mode may be employed in which a line or an arrow connects the coordinate in the display region on the display unit 102 corresponding to the location information (geographical coordinate) set for content information and the corresponding content displayed on the display unit 102. Still alternatively, a mode may be employed in which a content is displayed at a position adjacent to the coordinate in the display region on the display unit 102 corresponding to the location information (geographical coordinate) set for the content information.

Note that in this embodiment, the latitude and the longitude are contained in the content information as location information, while the height of the display position of the content, that is, the altitude at the geographical coordinate remains at a single value. However, a modified content display process may be employed besides the content display process exemplarily described in this embodiment. For example, the altitude may be set as location information of the content information in addition to the latitude and the longitude so that the height of the display position may be changed depending on the content. Also, when multiple display target contents are displayed on the display unit 102, the heights of their display positions may be dynamically changed so that the contents will not overlap each other in the display region. Alternatively, the display control part 205 may display a content with the height of its display position dynamically changed in accordance with the imaging area of the motion image captured by the imaging unit 103.

After displaying the content in step S906, the display control part 205 determines in step S907 whether or not a termination moment has come. The termination moment is, for example, when the AR application in the terminal apparatus 1 is terminated. If it is determined that the termination moment has not come, the series of processes illustrated in FIG. 9, that is, the content display process is repeated. Subsequently, as the location information and the posture of the terminal apparatus 1 shift from one moment to another, the display control part 205 changes the display target content and the display position of the content as appropriate in accordance with the shift in the location information and the posture of the terminal apparatus 1.

Further, the terminal apparatus 1 may receive a tap input using the touchscreen for the displayed content. In the case where the content-information storage part 340 stores display information (after tap) for the content for which this operational input is received, the display control part 205 displays the display information (after tap) for the content for which the operational input is received. In doing so, the display control part 205 may display the display information (after tap) on the display unit 102 instead of the display information displayed on the display unit 102 before the reception of the tap input. Alternatively, the display control part 205 may display the display information (after tap) on the display unit 102 in addition to the display information displayed on the display unit 102 before the reception of the tap input.

Also, the display control part 205 may perform the following control in a case where the display position of the displayed content is updated when a tap input using the touchscreen is received for the displayed content. Specifically, even when the display position of the content is updated and then a tap input is received for the content at its display position before the update, the display control part 205 may display the display information (after tap) on the display unit 102 if the tap input is received within a predetermined period of time (for example, within 1 to 3 seconds) following the update. In this way, the decrease in operability may be further suppressed.

The display control part 205 terminates the content display process illustrated in FIG. 9 if it is determined in step S907 that the termination moment has come. Note that the content display process illustrated in FIG. 9 may, for example, be executed periodically or non-periodically while the AR application in the terminal apparatus 1 is running. Moreover, in the case where the content display process illustrated in FIG. 9 is executed periodically, it may be executed in the same execution cycle as the execution cycle of the below-described location-information update process in FIG. 10 or executed in a different execution cycle.

[Location-Information Update Process]

The location-information update process in this embodiment will be described. The terminal apparatus 1 executes the location-information update process in parallel with the content display process described using FIG. 9, for example.

Figure 10:
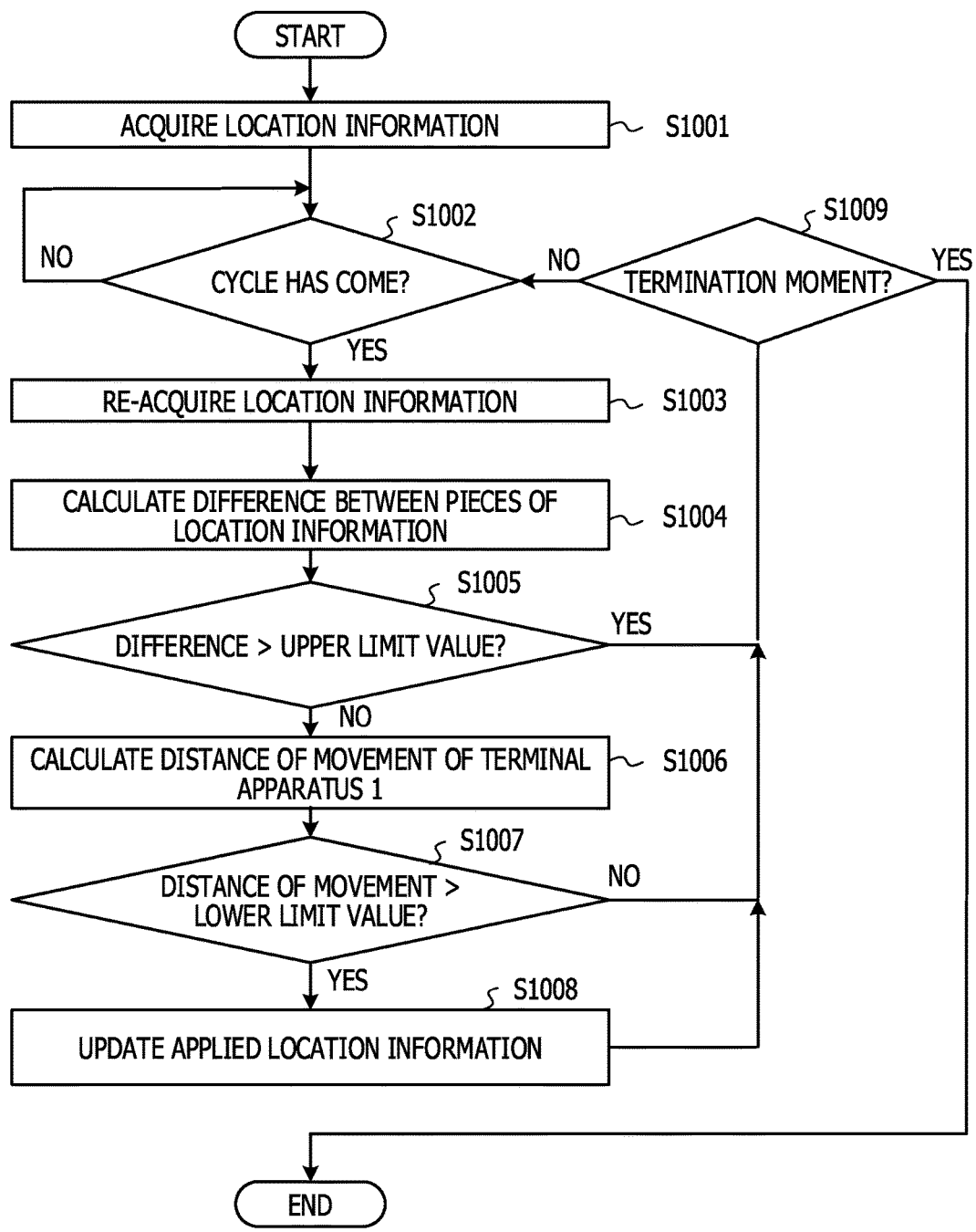
FIG. 10 illustrates a flowchart of a location-information update process in the embodiment.

FIG. 10 is a flowchart of the location-information update process in this embodiment. Each process presented in the flowchart in FIG. 10 will be described below.

First, in step S1001, the first acquisition part 201 acquires the location information on the terminal apparatus 1 and stores the acquired location information in the location-information storage part 310 as the last location information 312. Here, the location information acquired by the first acquisition part 201 is location information acquired by the GPS receiver included in the terminal apparatus 1. Note that although step S1001 is the first location-information acquisition process following the start of the location-information update process illustrated in FIG. 10, the first acquisition part 201 stores the location information as the last location information 312 in order to hold the location information separately from the later-described new location information 313.

Then, in step S1002, the first acquisition part 201 determines whether or not a cycle for acquisition (re-acquisition) of the location information has come. Here, the first acquisition part 201 determines whether or not an acquisition cycle has come, based, for example, on whether or not the period of time indicated by the execution cycle 331, stored in the setting-information storage part 330 (1 second in this embodiment), has elapsed since the time of the last acquisition of the location information. If determining that an acquisition cycle has not come (S1002, NO), the first acquisition part 201 re-executes the process in step S1002. That is, the first acquisition part 201 holds the execution of the subsequent processes until an acquisition cycle comes.

If determining that an acquisition cycle has come (S1002, YES), the first acquisition part 201 re-acquires the location information on the terminal apparatus 1 and stores the acquired location information in the location-information storage part 310 as the new location information 313 in step S1003. In step S1003 too, the location information acquired by the first acquisition part 201 may be location information acquired by the GPS receiver included in the terminal apparatus 1, as in step S1001.

In step S1004, the calculation part 203 calculates the difference between the last location information 312 and the new location information 313.

Then, in step S1005, the determination part 204 determines whether or not the difference calculated in step S1004 is greater than the value indicated by the upper limit value 332, stored in the setting-information storage part 330. The location-information update process proceeds to a process in step S1009 if it is determined that the calculated difference is greater than the value indicated by the upper limit value 332 (S1005, YES). On the other hand, the location-information update process proceeds to a process in step S1006 if it is determined that the calculated difference is less than or equal to the value indicated by the upper limit value 332 (S1005, NO).

Here, as mentioned earlier, the value set as the upper limit value 332 is determined taking into consideration, for example, the accuracy of acquisition of the location information by the GPS receiver included in the terminal apparatus 1 and the distance that the user of the terminal apparatus 1 may move in an execution cycle. More specifically, the value set as the upper limit value 332 is, for example, the sum of the accuracy of the acquisition of location information by the GPS receiver and the distance that the user of the terminal apparatus 1 may move in an execution cycle.

By determining the upper limit value 332 as mentioned above, location information greatly different from the actual location information on the terminal apparatus 1 is considered to have been acquired due to a measurement error or the like, if the difference calculated in step S1004 is greater than the value indicated by the upper limit value 332. Thus, the new location information acquired in step S1003 is processed without being reflected on the content display process of displaying the content on the display unit 102.

Meanwhile, if it is determined that the difference calculated in step S1004 is less than or equal to the value indicated by the upper limit value 332 (S1005, NO), the location-information update process proceeds to a process in step S1006. In step S1006, the calculation part 203 calculates the distance of movement of the terminal apparatus 1 in a predetermined period of time based on measurement values acquired by the acceleration sensor and the gyro sensor included in the terminal apparatus 1. The predetermined period of time is, for example, the execution cycle mentioned above.

For example, the calculation part 203 may calculate the path of movement of the terminal apparatus 1 in the predetermined period of time by utilizing an inertial navigation method using the acceleration received by the terminal apparatus 1 and acquired with the acceleration sensor and the direction of movement of the terminal apparatus 1 identified by the gyro sensor. Then, based on the calculated path of movement, the calculation part 203 may calculate the distance of movement of the terminal apparatus 1 in the predetermined period of time. Here, the distance of movement may be the direct distance from the start to the end of the calculated path of movement or the length of the path of movement. Alternatively, the calculation part 203 may estimate the number of steps taken by the user of the terminal apparatus 1 based on the result of measurement by the acceleration sensor, and calculate the distance of movement by multiplying a preset distance per step of the user by the estimated number of steps.

After the distance of movement is calculated by the process in step S1006, the determination part 204 determines in step S1007 whether or not the calculated distance of movement is greater than the value indicated by the lower limit value 333, stored in the setting-information storage part 330. The location-information update process proceeds to the process in step S1009 if it is determined that the calculated distance of movement is less than or equal to the value indicated by the lower limit value 333 (S1007, NO).

On the other hand, the location-information update process proceeds to a process in step S1008 if it is determined that the calculated distance of movement is greater than the value indicated by the lower limit value 333 (S1007, YES). In step S1008, the first acquisition part 201 updates the value of the applied location information 311, stored in the location-information storage part 310, to the location information stored as the new location information 313. That is, after the process in step S1008, the content display process described with reference to FIG. 9 is executed based on the location information acquired in step S1003. After step S1008, the location-information update process proceeds to the process in step S1009.

In step S1009, the first acquisition part 201 determines whether or not a termination moment has come. The termination moment is, for example, when the AR application in the terminal apparatus 1 is terminated, as in the content display process illustrated in FIG. 9. The processes in and after step S1002 are repeated if it is determined that the termination moment has not come (S1009, NO). The series of processes illustrated in FIG. 10 is terminated if it is determined that the termination moment has come (S1009, YES).

Advantages achieved by the above-described location-information update process will now be described. In a case where the user is moving by walking and tries to check a content displayed on the display screen of the terminal apparatus, the user may possibly stop moving and continue imaging the same imaging area. Here, if the display position of the content changes frequently while the user stops remains still and continues imaging the same imaging area, the visibility of the information displayed as the content is impaired, as mentioned earlier.

In this embodiment, when the distance of movement of the terminal apparatus in the predetermined period of time is less than or equal to the lower limit value, the newly acquired location information is not applied to the content display process. This suppresses frequent shift in display position of the content on the display screen when the distance of movement of the terminal apparatus 1 is short, that is, when the user of the terminal apparatus is considered to have stopped moving and been continuing imaging the same imaging area. Thus, the decrease in visibility for checking the details of the content displayed on the display screen may be suppressed. Moreover, the decrease in operability for designating the content displayed on the display screen with a tap input or the like may be suppressed.

The newly acquired location information is applied to the content display process when the distance of movement of the terminal apparatus in the predetermined period of time is greater than the lower limit value. In other words, the new location information is applied to the content display process when the terminal apparatus moves a reference distance or longer in the predetermined period of time. In this way, the display position of the content in the display region will not be greatly misaligned from the superimposition target due to the suppression of frequent shift in display position of the content on the display screen.

Also, the display position of the content on the display screen of the terminal apparatus is updated at a timing different from a timing when the user is considered to be checking the displayed content (when the distance of movement is short). That is, the display position of the content on the display screen of the terminal apparatus is updated at a timing when the user and the terminal apparatus are moving and the user is unlikely to be checking the displayed content. In this way, it is possible to reduce the adverse influence of the update of the display position of the content on the viewing of the display information and the operational input on the displayed content.

In this embodiment, the distance of movement of the terminal apparatus is calculated using the results of measurement by the acceleration sensor and the gyro sensor. This is because, when the distance of movement is short and the interval for calculating the distance of movement is short, the distance of movement calculated using the acceleration sensor and the gyro sensor is considered to have a smaller calculation error than the distance of movement calculated using GPS location information. It is also because the calculation of the distance of movement using the inertial sensor (acceleration sensor and gyro sensor) is significantly lower in processing load than the calculation of the location information using these, and may therefore be implemented easily even by, for example, a terminal apparatus with relatively low processing power, such as a mobile phone. Thus, whether or not the location of the terminal apparatus is actually shifting may be determined even when an error is present in the location information acquired by the GPS receiver.

In the case where a content related to a shop or a building is registered as in this embodiment, its location information is usually considered to be set using a geographical coordinate (latitude and longitude). Thus, in this embodiment, the distance of movement of the terminal apparatus is calculated using the inertial sensor, but the content display process is executed based on the location information on the terminal apparatus acquired by the GPS receiver. This may reduce the process of converting the location information into a geographical coordinate and the processing load thereof as compared to a case where the location information is calculated using the inertial sensor. However, the content display process may be implemented utilizing location information calculated from the result of measurement by the inertial sensor.

Further, the first acquisition part 201 does not apply the new location information to the content display process when the difference between the last location information and the new location information is greater than the set upper limit value. Here, the upper limit value is, for example, the sum of the accuracy of acquisition of the location information by the GPS receiver and the distance that the user of the terminal apparatus 1 may move in an execution cycle. In this way, if the difference is so large that the user may not be able to move such a distance, that is, the measurement is considered to be erroneous measurement, the content display process will not be performed based on the erroneously measured location information.

Also, according to this embodiment, an intense content display process is avoided, which achieves an advantage that the processing load on the terminal apparatus and the power consumption of its battery may be reduced.

[Hardware Configuration and Modification]

Figure 11:
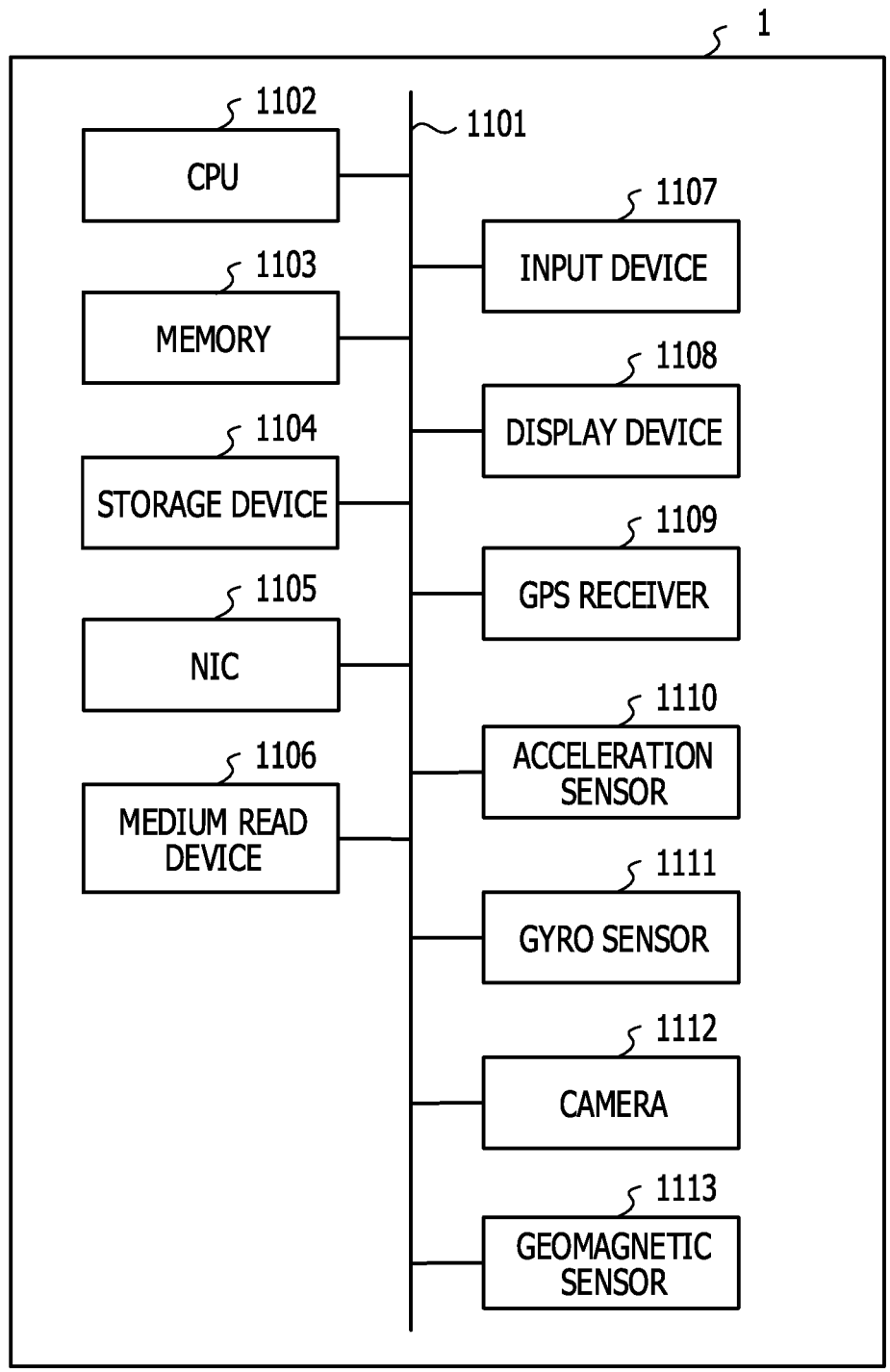
FIG. 11 illustrates an example of the hardware configuration of the terminal apparatus in the embodiment.

FIG. 11 is an example of the hardware configuration of the terminal apparatus 1 in this embodiment. The terminal apparatus 1 is, for example, an information processing apparatus including a CPU 1102, a memory 1103, a storage device 1104, an NIC 1105, a medium read device 1106, an input device 1107, a display device 1108, a GPS receiver 1109, an acceleration sensor 1110, a gyro sensor 1111, a camera 1112, and a geomagnetic sensor 1113, which are connected to each other by a bus 1101.

The CPU 1102 performs various types of operation control in the terminal apparatus 1. The memory 1103 and the storage device 1104 store a program for executing the various processes described in this embodiment and the various pieces of data utilized in the various processes. The storage device 1104 is, for example, a storage medium such as a HDD or an SSD.

The CPU 1102 may read out the program stored in the memory 1103 or the storage device 1104 and execute the processes and control to implement the control unit 200 and the functional parts included in the control unit 200, which are illustrated in FIG. 3. Also, the memory 1103 and the storage device 1104 may function as the storage unit 300, which is illustrated in FIG. 3.

The NIC 1105 is hardware used to transmit and receive data through a wired or wireless network. The NIC 1105 may function as the communication unit 104 under control of the CPU 1102.

The medium read device 1106 is a device that reads data from a record medium and is, for example, a disk drive that reads data stored in a disk medium such as a CD-ROM or a DVD-ROM, a card slot that reads data stored in a memory card, or the like. Part or all of the data stored in the above-mentioned storage unit 300 may be stored in a record medium that may be read by using the medium read device 1106.

The input device 1107 is a device that receives inputs and designations from the user of the terminal apparatus 1. The display device 1108 displays various pieces of information under control of the CPU 1102. The input device 1107 is, for example, a keyboard, a mouse, and a touchpad. The display device 1108 is, for example, a liquid crystal display. In this embodiment, for example, a touchscreen having the function of the input device 1107 and the function of the display device 1108 may be used.

The GPS receiver 1109 is a device that receives a signal from a satellite of a satellite positioning system and identifies the current location, that is, the location information on the terminal apparatus 1 based on the received signal. A function of the first acquisition part 201 may be implemented by, for example, storing location information identified by the GPS receiver 1109 into the memory 1103 and causing the CPU 1102 to read out the stored location information. Meanwhile, instead of the GPS receiver 1109, the terminal apparatus 1 may include a receiver utilizing a wireless positioning system other than the GPS. The wireless positioning system other than the GPS is, for example, a system that identifies a location based on the intensity of reception of electric waves transmitted from a wireless access point, or a satellite positioning system other than the GPS.

The acceleration sensor 1110 is hardware that may measure acceleration received by the terminal apparatus 1. A function of the first acquisition part 201 may be implemented by, for example, storing location information identified by the acceleration sensor 1110 into the memory 1103 and causing the CPU 1102 to read out the stored location information.

The gyro sensor 1111 is hardware that may acquire the tilt of the terminal apparatus 1 relative to a horizontal plane or the like. The tilt is expressed, for example, by the roll angle and the pitch angle mentioned in the description of FIG. 5. A function of the first acquisition part 201 may be implemented by, for example, storing numerical values indicating the tilt of the terminal apparatus identified by the gyro sensor 1111 into the memory 1103 and causing the CPU 1102 to read out the stored numerical values indicating the tilt.

Note that the acceleration sensor 1110 and the gyro sensor 1111 may be an inertial sensor having the functions of both the acceleration sensor and the gyro sensor or the function of at least one of them.

The camera 1112 captures a motion image, and the captured motion image is displayed on the display device 1108 under control of the CPU 1102. A content corresponding to the location information and the posture information on the terminal apparatus 1 is superimposed and disposed on the motion image displayed on the display device 1108 by the content display process described in this embodiment.

The geomagnetic sensor 1113 is hardware that may identify the azimuth of the terminal apparatus 1 or the camera 1112. A function of the first acquisition part 201 may be implemented by storing a numerical value indicating the azimuth identified by the geomagnetic sensor 1113 into the memory 1103 and causing the CPU 1102 to read out the stored numerical value indicating the azimuth.

Figure 12:
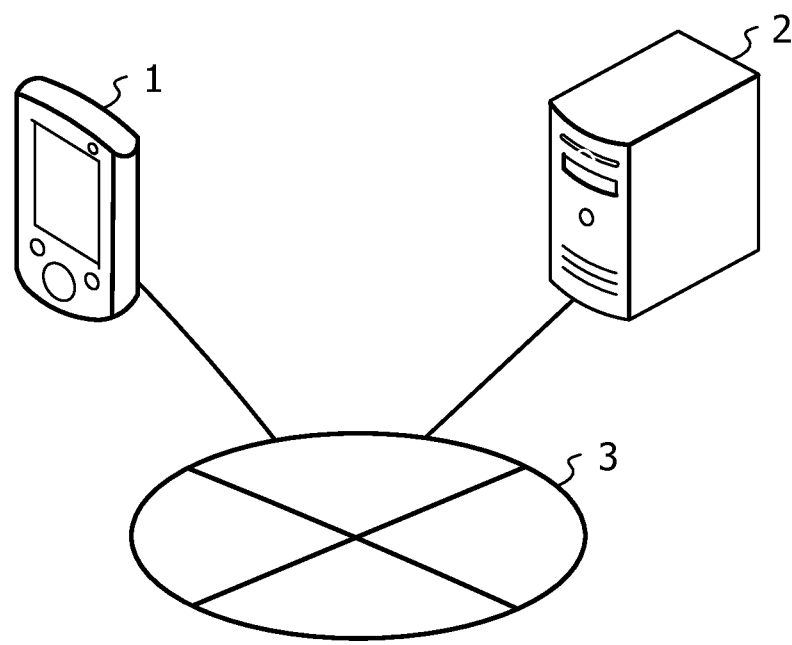
FIG. 12 illustrates another type of hardware configuration in the embodiment.

FIG. 12 is a diagram illustrating another type of hardware configuration in this embodiment. This embodiment may be implemented not only by using the terminal apparatus 1 alone but also by using the terminal apparatus 1 and a server apparatus 2, as illustrated in FIG. 12.

In FIG. 12, the terminal apparatus 1 may communicate with the server apparatus 2 through a network 3. The functional units and parts illustrated in FIG. 3 and the processes described in the flowchart in FIGS. 9 and 10 may be partly implemented using the server apparatus 2.

For example, the content-information storage part 340 of the storage unit 300 may be implemented using a storage device included in the server apparatus 2. In this case, the content-information acquisition process executed by the second acquisition part 202 may be such that, for example, the communication unit 104 transmits the location information on the terminal apparatus 1 to the server apparatus 2, and the server apparatus 2 identifies the content information corresponding to the location information received. Then, the server apparatus 2 may transmit the identified content information to the terminal apparatus 1, and the terminal apparatus 1 may receive the transmitted content information, thereby acquiring the content information. Note that while the above description is given by taking the content-information storage part 340 as an example, the storage parts of the storage unit 300 other than the content-information storage part 340 may be implemented using the storage device included in the server apparatus 2.

Figure 13:
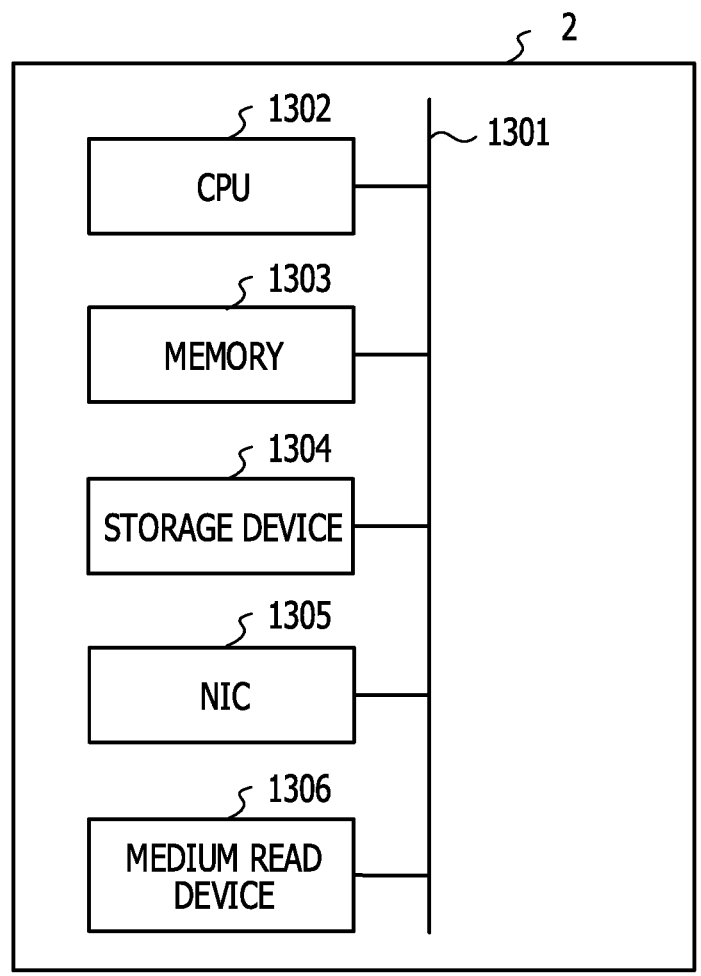
FIG. 13 illustrates an example of the hardware configuration of a server apparatus.

FIG. 13 is an example of the hardware configuration of the server apparatus 2. The server apparatus 2 is, for example an information processing apparatus including a CPU 1302, a memory 1303, a storage device 1304, an NIC 1305, a medium read device 1306, an input device 1307, and a display device 1308, which are connected to each other by a bus 1301.

Description of the CPU 1302, the memory 1303, the storage device 1304, the NIC 1305, the medium read device 1306, the input device 1307, and the display device 1308 is similar to the above-described CPU 1102, memory 1103, storage device 1104, NIC 1105, medium read device 1106, input device 1107, and display device 1108 and will therefore be omitted. However, the CPU 1302, the memory 1303, the storage device 1304, the NIC 1305, the medium read device 1306, the input device 1307, and the display device 1308 may be different from the CPU 1102, the memory 1103, the storage device 1104, the NIC 1105, the medium read device 1106, the input device 1107, and the display device 1108 in terms of specific hardware (type, performance, and so on).

The range of application is not limited to the AR technique described in the above embodiment. For example, the location-information update control described in this embodiment may be applied to a mode in which the location information on a remote robot or a drone is checked by using a terminal apparatus. By doing so, it is possible to suppress decrease in visibility of the location information displayed. Note that such a case is on the assumption that the robot or the drone includes a GPS receiver and an inertial sensor.

Also, in a case where location information set for a content shifts (moves) on the AR application, the location-information update process described in this embodiment may be applied to the location information update on the content side. A mode in which location information set for a content shifts (moves) is, for example, a mode in which the location information on a drone or a robot that is capable of moving is displayed and outputted using an AR technique, and a mode in which the location and movement of rain cloud are displayed and outputted by using an AR technique. In the case of such a mode in which location information set for a content shifts (moves), the location-information update process described in this embodiment may be applied not to a terminal apparatus but to a moving target. Alternatively, the location-information update process described in this embodiment may be applied to both location information set for a terminal apparatus (moving target) and location information set for a content (moving target).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a control program that causes a computer to execute a process, the process comprising:
 acquiring a first image;
 acquiring a first location of a target by using a wireless positioning system, the first location corresponding to the first image;
 displaying the first image and display information that is superimposed on the first image, the display information being displayed with associating with a first location coordinate on the first image, the first location coordinate being determined based on the first location of the target;
 acquiring a second image after the first image is acquired;
 acquiring a second location of the target by using the wireless positioning system when a specified period of time elapses after the first location is acquired, the second location corresponding to the second image;
 acquiring a distance of movement of the target during the specified period of time by using an inertial sensor included in the target;

making a determination of whether the display information is to be displayed with associating with the first location coordinate or a second location coordinate on the second image data based on the distance of movement, the second location coordinate being determined based on the second location of the target; and displaying the second image and the display information that is superimposed on the second image based on the determination.

2. The non-transitory computer-readable storage medium according to claim 1, wherein
each of the first image and the second image is captured by the target.

3. The non-transitory computer-readable storage medium according to claim 1, wherein the process comprises:
when the distance of movement is less than a first predetermined value, making a determination that the display information is to be displayed with associating with the first location coordinate.

4. The non-transitory computer-readable storage medium according to claim 3, wherein
the first predetermined value is determined based on a speed at which a person walks or a distance which a person moves by walking in a predetermined period of time.

5. The non-transitory computer-readable storage medium according to claim 3, wherein the process further comprises:
when a difference between the first location and the second location is greater than a second predetermined value greater than the first predetermined value, making the determination that the display information is to be displayed with associating with the first location coordinate.

6. The non-transitory computer-readable storage medium according to claim 3, wherein
the second predetermined value is determined based on a speed at which a person walks or a distance which a person moves by walking in a predetermined period of time and based on tolerance of location measurement using the wireless positioning system.

7. The non-transitory computer-readable storage medium according to claim 3, wherein the process comprises:
when the distance of movement is equal to or greater than the first predetermined value, making a determination that the display information is to be displayed with associating with the second location coordinate.

8. The non-transitory computer-readable storage medium according to claim 7, wherein the process further comprises:
upon receipt of an operation designating a location coordinate on the first image data with the display information superposed and displayed thereon, displaying display information different from the display information before the reception of the operation on the image data; and
when a display position of the display information is updated from a position corresponding to the first location coordinate to a position corresponding to the second location coordinate, performing control such that the location coordinate with the display information displayed thereon is considered designated if a designated location coordinate corresponds to the second location coordinate and does not correspond to the first location coordinate, within a predetermined period of time following the update.

9. The non-transitory computer-readable storage medium according to claim 1, wherein
the image data is a motion image captured by an imaging device.

10. The non-transitory computer-readable storage medium according to claim 1, wherein
the inertial sensor includes at least one of a gyro sensor and an acceleration sensor.

11. The non-transitory computer-readable storage medium according to claim 1, wherein
the target is the computer.

12. A control method executed by a computer, the control method comprising:
acquiring a first image;
acquiring a first location of a target by using a wireless positioning system, the first location corresponding to the first image;
displaying the first image and display information that is superimposed on the first image, the display information being displayed with associating with a first location coordinate on the first image, the first location coordinate being determined based on the first location of the target;
acquiring a second image after the first image is acquired;
acquiring a second location of the target by using the wireless positioning system when a specified period of time elapses after the first location is acquired, the second location corresponding to the second image;
acquiring a distance of movement of the target during the specified period of time by using an inertial sensor included in the target;
making a determination of whether the display information is to be displayed with associating with the first location coordinate or a second location coordinate on the second image data based on the distance of movement, the second location coordinate being determined based on the second location of the target; and
displaying the second image and the display information that is superimposed on the second image based on the determination.

13. A computer comprising:
a memory; and
a processor coupled to the memory and the processor configured to:
acquire a first image;
acquire a first location of a target by using a wireless positioning system, the first location corresponding to the first image;
display the first image and display information that is superimposed on the first image, the display information being displayed with associating with a first location coordinate on the first image, the first location coordinate being determined based on the first location of the target;
acquire a second image after the first image is acquired;
acquire a second location of the target by using the wireless positioning system when a specified period of time elapses after the first location is acquired, the second location corresponding to the second image;
acquire a distance of movement of the target during the specified period of time by using an inertial sensor included in the target;
make a determination of whether the display information is to be displayed with associating with the first location coordinate or a second location coordinate on the second image data based on the distance of movement, the second location coordinate being determined based on the second location of the target; and display the second image and the display information that is superimposed on the second image based on the determination.

\* \* \* \* \*